United States Patent Office 3,626,783
Patented Dec. 14, 1971

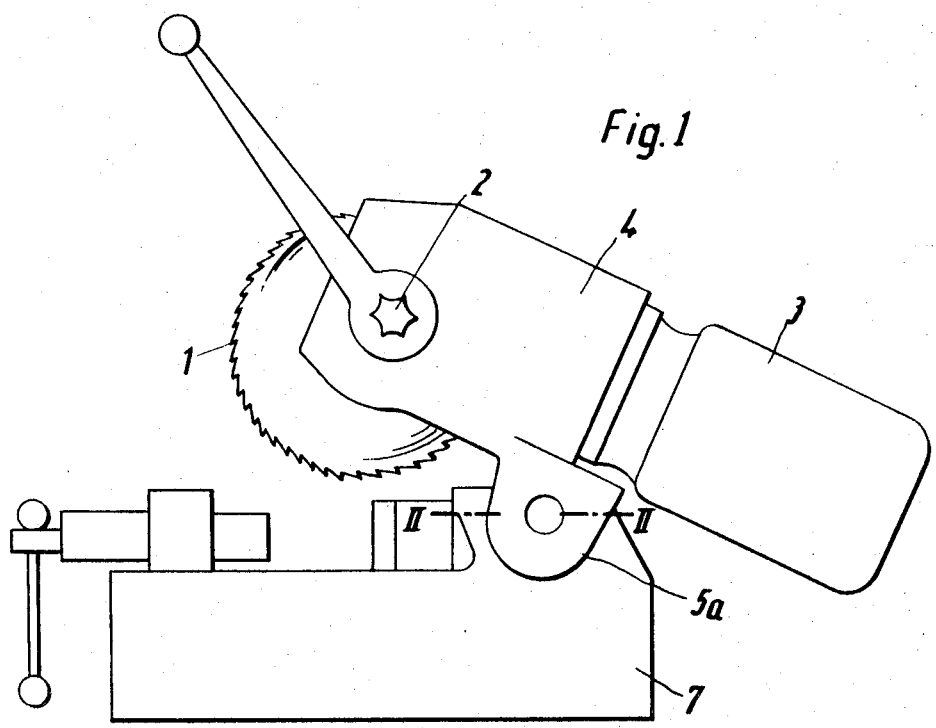

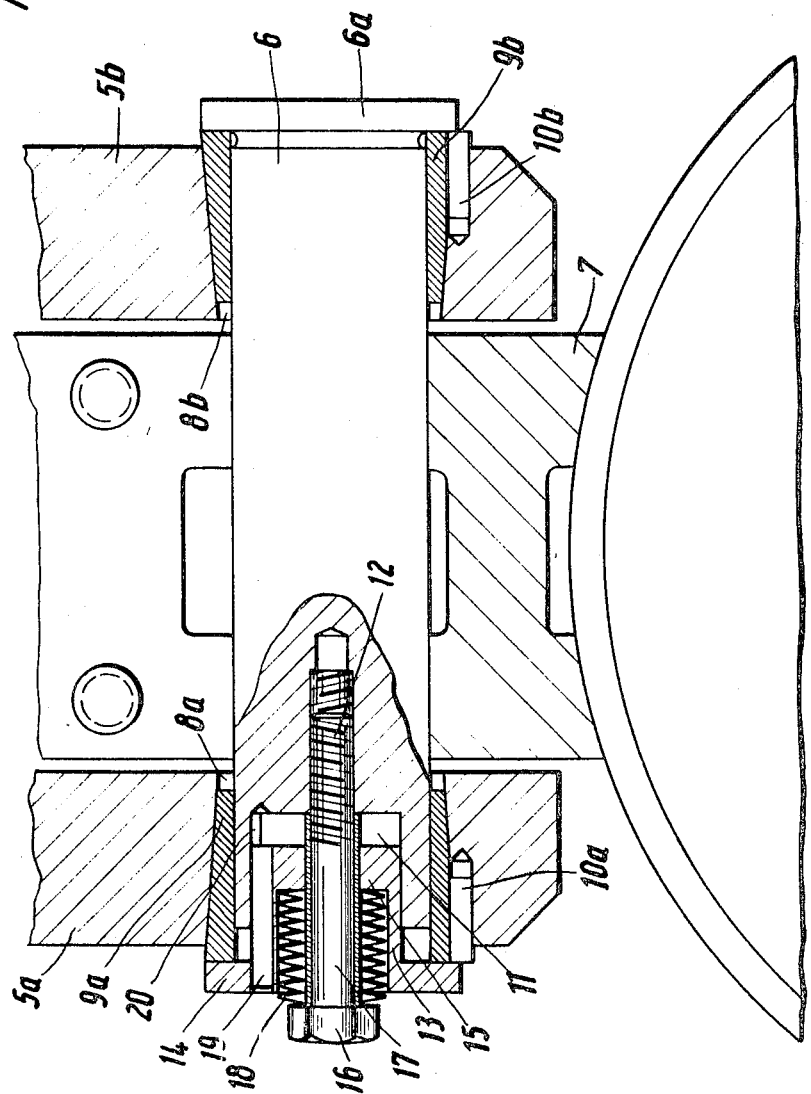

3,626,783
CIRCULAR SAW
Leopold Jägers, 1 Rudolf-Diesel-Strasse,
535 Euskirchen, Rhineland, Germany
Filed Apr. 9, 1970, Ser. No. 31,432
Int. Cl. B23d 45/04
U.S. Cl. 83—490    5 Claims

ABSTRACT OF THE DISCLOSURE

A section of a support is provided with a hole and a rocking lever has a bifuracted end portion which straddles the section and whose arms are provided with aligned bores registering with the hole in the section. a pair of conical sleeves are provided in each of the bores tapering towards one another and a bolt extends through the sleeves and the hole. The screw is threaded into an exposed end of the bolt and engages the associated sleeve for urging the same inwardly towards the other sleeve One or more springs are arranged and stressed between the screw and the associated sleeve.

BACKGROUND OF THE INVENTION

The present invention relates generally to saws, and more particularly to circular saws. Still more specifically the present invention relates to the mounting of a rocking lever for a circular saw.

It is known in certain types of circular saws to provide a rocking lever which is rockably connected with a support and carries at one end the circular saw, as well as carrying the drive motor and the drive for driving the saw blade. In such constructions it is known to make one end portion of the rocking lever of bifurcated configuration and to have it straddle a section of the support with a bolt extending through the bifurcated end portion and the support for connecting them in rockable relationship. Conically tapered sleeves are received in bores provided in the two arms or portions of the bifurcated end portion and through which the bolt extends, and these sleeves taper conically in direction towards one another and are interposed between the inner surfaces surrounding the bores and corresponding outer surface portions of the bolt. A screw is provided for drawing the sleeves inwardly towards one another, the purpose being to provide for a movement of the rocking lever in such a manner that a precise movement of the circular saw blade in the general plane of the latter is guaranteed as the rocking lever or rocking arm carrying the saw blade and is rocked or pivoted during operation of the saw, that is with the saw blade being rotated.

It has been found, however, that in such constructions a difficulty exists which makes improvements definitely desirable. Specifically, it is necessary on the one hand that conical sleeves engage the bolt sufficiently tightly to assure that during movement of the rocking lever the circular saw blade cannot become displaced out of its predetermined plane because this would change the smoothness of the cut, and could cause binding of the saw blade in the material being sawed and might result in damage to the saw blade and/or such material. On the other hand, however, it is necessary to avoid that the friction between the sleeves and the bolt becomes so large that pivoting or rocking of the rocking lever is excessively difficult. Because of this experience has shown that in the known constructions operators frequently loosen the screw drawing the sleeves towards one another, in order to make the movement of the rocking lever less difficult. This, of course, completely negates the advantages sought to be obtained with this type of mounting and leads to premature blunting of the circular saw blade, if not to breakage thereof, not to mention inaccurate cuts or damage to the material which is being sawed.

SUMMARY OF THE INVENTION

It is, accordingly, an object of the present invention to avoid the aforementioned disadvantages.

More particularly it is an object of the present invention to provide a construction of the type under discussion which is not possessed of these drawbacks.

At the same time it is an additional object of the invention to provide such a construction which is simple and therefore economical to produce and assemble.

In pursuance of the above objects, and others which will become apparent hereafter, one feature of the invention recites in a circular saw which comprises. in combination, a support having a section with a hole and a rocking lever or rocking arm having a first and a bifurcated second portion with the latter straddling the aforementioned section of the support. A circular saw blade is carried by the first portion and a pair of aligned bores are provided in the two arms of the bifurcated second portion in registry with the hole. A pair of conical sleeves are received in the respective bores tapering in direction towards one another and a bolt extends through the sleeves and the hole and connects the arms with the section for rocking movement of the lever relative to the latter. Screw means is threaded into an exposed end of the bolt and engages the respective sleeve for urging it inwardly toward the other sleeve and spring means is arranged and stressed between the screw means and the associated sleeve.

Advantageously an abutment is provided for the screw means with reference to the bolt.

Different types of spring means may be provided, and advantageously the spring means will be in form of one or a package of dished springs.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a somewhat diagrammatic side-elevational view illustrating a construction according to the present invention, and FIG. 2 is a section taken on the line II—II of FIG. 1.

DESCRIPTION OF THE PREFERRED EMBODIMENTS

Discussing now the drawing in detail it will be seen that all such features of a circular saw which are not germane to the present invention have been omitted to avoid confusion and for the sake of clarity of illustration.

Reference numeral 1 in the drawing identifies a conventional circular saw blade mounted on an axle 2 which is driven by a motor 3 via a drive mounted in a housing 4. No details are necessary concerning the saw blade 1, the motor 3 and the drive in the housing 4 because all of these features are entirely conventional and well known to those skilled in the art. Furthermore, their construction and operation have no bearing on the present invention.

It is pointed out, however, that the housing 4 constitutes a rocking lever or rocking arm one portion of which is identified with reference numeral 5 and is of bifurcated configuration so as to have two parallel arms 5a and 5b (compare FIGS. 1 and 2). These arms are provided with inwardly conical bores 8a and 8b, respectively, the expression inwardly conical referring to the fact that the bores taper in direction towards one another as is most clearly evident from FIG. 2. A bolt 6 passes through the bores 8a and 8b and through a hole (no reference numeral) which is provided in a section 7 of the support, with the latter in turn being mountable on a frame, base or the like which is not illustrated because it forms no part of the invention.

As FIG. 2 shows, each of the bores 8a and 8b accommodates a sleeve 9a and 9b, respectively, with these sleeves being situated in the space between the bolt 6 and the respective inner circumferential surfaces bonding the bores 8a and 8b. The sleeves 9a and 9b are circumferentially incomplete in that they are each provided with an axial slot. FIG. 2 shows clearly that the inner surfaces of the sleeves are cylindrical whereas the outer surfaces taper conically in a manner opposite the respective bores 8a and 8b, so as to complement the same.

FIG. 2 also shows that the bolt 6 is provided with a head or transverse portion 6a which abuts against the axially outermost axial end face of the sleeve 9b, as illustrated. A pin 10b extends partially into the wall of the sleeve 9b and partially into the arm 5b, being at least substantially coaxial with the bolt 6, and prevents a turning of the sleeve 9b with reference to the arm 5b. Its effect is analogous to that of a conventional Woodruff key.

The same arrangements obtains with reference to the sleeve 9a, except that the corresponding pin is here identified with reference numeral 10a. The end of the bolt 6 which is associated with the sleeve 9a, however, is provided with a cylindrical recess 11 concentric with the axis of the bolt 6, from which a similarly concentric internally tapped bore 12 extends further inwardly into the bolt 6. A sleeve 13 is accommodated in the recess 11 and provided with a radial flange 14 located exteriorly of the recess 11 and abutting the outermost axial end face of the sleeve 9a, as illustrated in FIG. 2. In addition, the sleeve 13 is also provided with a radially inwardly extending abutment shoulder 15 axially spaced from the flange 14. A screw or bolt 16 extends through the sleeve 13 and is threaded into the tapped bore 12 of the bolt 6. One or more expansion springs 18—in the illustrated embodiment a package of dished springs—is received in the sleeve 13 interposed between the head of the bolt 16 and the abutment shoulder 15. Pin 19 extends through an eccentric bore 20 which passes from the bottom of the recess 11 in axial direction of the bolt 6 so that the pin 19 penetrates the abutment shoulder 15 as illustrated.

It is evident that in this construction it is the spring or springs 18 which determines the force with which the sleeves 9a and 9b are drawn towards one another.

Of course it will be appreciated that other springs than the illustrated dished springs could also be utilized.

The bolt 6 is non-rotatable with reference to the section 7. The bolt 16 has a portion 17 adjacent its head which is of a larger diameter than the externally screw-threaded remainder which engages with the threads in the tapped bore 12, so that the radial shoulder provided at the junction between this remainder and the portion 17 constitutes with the bottom wall of the recess 11 an abutment with the construction of course being so calculated that the abutment takes place at such time as the bolt 16 is threaded into the bore 12 to the maximum desired extent.

It will be appreciated that with the construction according to the present invention slight loosening of the bolt 16 by an operator would not effect to any appreciable extent the force with which sleeves 9a and 9b are drawn inwardly towards one another by the spring or springs 18. On the other hand, if the bolt 16 were to be loosened to a significant extent until such time as the force exerted by the spring or springs 18 could indeed be affected, it would become disconnected from the tapped bore 12 which of course is out of the question, so that the operator is indeed left with no choice but to refrain from tampering with the mounting. Conversely, of course, the force with which the sleeves 9a and 9b are drawn inwardly towards one another—and accordingly the force required for pivoting the rocking lever 4 about the bolt 6—cannot be inadvertently increased by excessive tightening of the bolt 16. Thus, the disadvantages inherent in the prior-art constructions and outlined in the introductory portions of this specification, are overcome with the present invention.

It will be understood that each of the elements described above, or two or more together, may also find a useful application in other types of constructions differing from the types described above.

While the invention has been illustrated and described as embodied in a circular saw, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adapations should and are intended to be comprehended within the meaning and range of equivalence of the following claims.

What is claimed as new and desired to be protected by Letters Patent is set forth in the appended claims:

1. In a circular saw, in combination, a support having a section with a hole; a rocking lever having a first and a bifurcated second portion straddling said section of said support; a circular saw blade carried by said first portion of said rocking lever; a pair of aligned bores in the two arms of said bifurcated second portion and registering with said lid; a pair of conical sleeves in the respective bores tapering in direction toward one another; a bolt extending through said sleeves and hole and connecting said arms with said section for rocking movement of said lever relative to the latter; screw means threaded into one exposed end of said bolt and engaging the respective sleeve for urging it inwardly toward the other sleeve; and spring means arranged and stressed between said screw means and the associated sleeve.

2. In a circular saw as defined in claim 1; and abutment means for limiting the extent to which said screw means may be threaded into said one portion.

3. In a circular saw as defined in claim 1; wherein said sleeves are circumferentially incomplete.

4. In a circular saw as defined in claim 1, wherein said spring means comprises at least one dished spring.

5. In a circular saw as defined in claim 1, wherein said spring means comprises a package of dished springs.

References Cited
UNITED STATES PATENTS 2,247,183   6/1941   Bout   143—46 R

JAMES M. MEISTER, Primary Examiner

U.S. Cl. X.R.

83—698; 143—46 R